(12) United States Patent
Marupaduga et al.

(10) Patent No.: US 11,582,678 B2
(45) Date of Patent: Feb. 14, 2023

(54) DYNAMIC RAT DETERMINATION FOR COMMON RESOURCE BLOCKS

(71) Applicant: T-Mobile Innovations LLC, Overland Park, KS (US)

(72) Inventors: Sreekar Marupaduga, Overland Park, KS (US); Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 56 days.

(21) Appl. No.: 17/230,174

(22) Filed: Apr. 14, 2021

(65) Prior Publication Data

US 2022/0338097 A1    Oct. 20, 2022

(51) Int. Cl.
*H04W 48/02*  (2009.01)
*H04B 17/345*  (2015.01)

(52) U.S. Cl.
CPC .......... *H04W 48/02* (2013.01); *H04B 17/345* (2015.01)

(58) Field of Classification Search
CPC ....... H04W 48/02; H04B 17/345; H04B 1/56; H04B 10/40; H04B 10/50
See application file for complete search history.

(56) References Cited

U.S. PATENT DOCUMENTS

| | | | |
|---|---|---|---|
| 7,636,322 B1 | 12/2009 | Gandhi et al. | |
| 9,654,231 B1 * | 5/2017 | Marupaduga | H04B 17/318 |
| 9,854,597 B2 * | 12/2017 | Chen | H04W 72/1231 |
| 10,193,727 B1 * | 1/2019 | Sung | H04L 27/2602 |
| 10,314,071 B2 * | 6/2019 | Zhuang | H04W 16/32 |
| 10,470,193 B2 * | 11/2019 | Qin | H04W 72/1231 |
| 10,660,151 B2 | 5/2020 | Futaki | |
| 2017/0196014 A1 | 7/2017 | Qin | |
| 2017/0325251 A1 | 11/2017 | Sadek | |
| 2020/0196281 A1 | 6/2020 | Bergman et al. | |

FOREIGN PATENT DOCUMENTS

| | | |
|---|---|---|
| CN | 112637939 A | 4/2021 |
| EP | 3799503 A1 | 3/2021 |

OTHER PUBLICATIONS

EESR, dated Sep. 2, 2022, from related EP Application No. 22167648.9-1216.

* cited by examiner

*Primary Examiner* — Chandrahas B Patel
(74) *Attorney, Agent, or Firm* — Jones Robb, PLLC (57) ABSTRACT

A system and method of managing network resources is provided, in which a noise threshold for an access node is set, the access node including a first plurality of resource blocks corresponding to communication in a first communication mode and a second plurality of resource blocks corresponding to communication in either of the first communication mode or a second communication mode; a noise parameter for the second plurality of resource blocks is monitored; the noise parameter is compared to the noise threshold; and in response to a determination that the noise parameter exceeds the noise threshold, access to the second plurality of resource blocks for communication in the first communication mode is restricted.

19 Claims, 6 Drawing Sheets

DYNAMIC RAT DETERMINATION FOR COMMON RESOURCE BLOCKS

TECHNICAL BACKGROUND

A wireless network, such as a cellular network, can include an access node (e.g., a base station) serving multiple wireless devices or user equipment (UE) in a geographical area covered by a radio frequency transmission provided by the access node. Different carriers or carrier divisions within the cellular network may utilize different types of radio access technologies (RATs). RATs can include, for example, 3G RATs such as Global System for Mobile Communications (GSM), Code-Division Multiple Access (CDMA), etc.; 4G RATs such as Worldwide Interoperability for Microwave Access (WiMAX), Long Term Evolution (LTE), etc.; and 5G RATs such as new radio (NR).

Additionally, in recent years, networks have evolved to connect using the Internet of things (IoT), which describes the network of physical objects or things that are embedded with sensors, software, and other technologies for the purpose of connecting and exchanging data with other devices and systems over the Internet. Cellular IoT is a way of connecting physical devices such as sensors to the internet by having them utilize the same mobile networks as wireless devices. In the consumer market, IoT technology is frequently utilized to equip the "smart home," including devices and appliances such as lighting fixtures, thermostats, home security systems and cameras, and other appliances which support one or more common ecosystems, and can be controlled via devices associated with that ecosystem, such as smartphones and smart speakers. Cellular IoT itself is a rapidly growing ecosystem based on 3rd Generation Partnership Project (3GPP) global standards, supported by an increasing number of mobile network providers as well as device, chipset, module, and network infrastructure vendors. Cellular IoT improves over other Low Power Wide Area (LPWA) network technologies in terms of quality of service (QoS), scalability, flexibility, and the like.

Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies are often used in combination with newer technologies. Cellular IoT applications generally use one of two technologies: narrowband IoT (NB-IoT) and Category M1 (Cat-M1), which are both 3GPP standardized technologies. The technologies address different types of use cases based on their capabilities.

Cat-M1 operates at 1.4 MHz bandwidth with higher device complexity/cost than NB-IoT. The wider bandwidth allows Cat-M1 to achieve greater data rates (up to 1 megabit per second (Mbps)), lower latency, and more accurate device positioning capabilities. Cat-M1 supports voice calls and connected mode mobility. Exemplary use cases for Cat-M1 include connected vehicles, wearable devices, trackers, and alarm panels. Cat-M1 devices can exist in a sleep mode for extended periods of time, which greatly reduces device power consumption.

Cat-M1 nodes generally use resources that are shared with LTE. Thus, while LTE devices may communicate with an access node using any available resource, the Cat-M1 devices are only capable of communicating on a smaller subset of the resources. Where an LTE device uses a resource in the smaller subset, the LTE communication (which may occur at a higher transmit power than Cat-M1 communication) may introduce noise, negatively impact device or network performance, and/or otherwise result in a reduced user experience. Thus, there exists a need for systems and methods for determining access to common resources to provide service efficiently; for example, by dynamically restricting or assigning one or more common resources to a particular RAT (such as Cat-M1) based on noise.

OVERVIEW

Various aspects of the present disclosure relate to systems and methods of managing network resources.

In one exemplary aspect of the present disclosure, a method of managing network resources comprises: setting a noise threshold for an access node, wherein the access node includes a first plurality of resource blocks corresponding to communication in a first communication mode and a second plurality of resource blocks corresponding to communication in either of the first communication mode or a second communication mode; monitoring a noise parameter for the second plurality of resource blocks; comparing the noise parameter to the noise threshold; and in response to a determination that the noise parameter exceeds the noise threshold, restricting access to the second plurality of resource blocks for communication in the first communication mode.

In another exemplary aspect of the present disclosure, a system for managing network resources comprises: an access node including a first plurality of resource blocks corresponding to communication in a first communication mode and a second plurality of resource blocks corresponding to communication in either of the first communication mode or a second communication mode, and at least one electronic processor configured to perform operations including: setting a noise threshold for the access node, monitoring a noise parameter for the second plurality of resource blocks, comparing the noise parameter to the noise threshold, and in response to a determination that the noise parameter exceeds the noise threshold, restricting access to the second plurality of resource blocks for communication in the first communication mode.

In another exemplary aspect of the present disclosure, a method of managing network resources comprises: setting a noise threshold for an access node, wherein the access node includes a first plurality of resource blocks corresponding to communication in a first communication mode and a second plurality of resource blocks corresponding to communication in either of the first communication mode or a second communication mode; determining a historical noise data for the access node; comparing the historical noise data to the noise threshold; in response to a determination that the historical noise data exceeds the noise threshold, designating the second plurality of resource blocks for communication in only the second communication mode; and in response to a determination that the historical noise data does not exceed the noise threshold, designating the second plurality of resource blocks for communication in both of the first communication mode and the second communication mode.

In this manner, these and other aspects of the present disclosure provide for improvements in at least the technical field of telecommunications, as well as the related technical fields of network management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, schematics, and system configurations. It will be readily apparent to one skilled in the art that these specific details are merely exemplary and not intended to limit the scope of this application.

In accordance with various aspects of the present disclosure, a cellular or wireless network may be provided by an access node. The access node may utilize one or more antennas to communicate with wireless devices or UEs. As the number of simultaneous wireless devices with which an access node communicates increases, so too does resource usage. In one example, consider a scenario in which a network operator is serving both LTE and Cat-M1 (e.g., with six common physical resource blocks within a host LTE cell) and an LTE device is using one of the common resource blocks. The LTE device may introduce noise which negatively affects the operation of Cat-M1 devices using other ones of the common resource blocks. In such a scenario, the resources have not been allocated efficiently, when a different allocation of resources could have saved device battery life, etc.

Thus, various aspects of the present disclosure may operate in an IoT cellular network utilizing multiple RATs, such as LTE and Cat-M1. By providing a system and method to dynamically determine access to particular resources (e.g., based on noise characteristics), the present disclosure may improve the overall performance of LTE and Cat-M1 devices, may improve the battery usage parameters of Cat-M1 devices, improve overall cell resource utilization, and so on.

In practical implementations, noise is present in the IoT cellular network. Noise may be introduced by several sources, including but not limited to environmental conditions, temporary changes in the operating conditions of an access node, interference between different connected wireless devices, interference caused due to external nodes operating in adjacent bands, and so on. Noise may be measured using different representations, including but not limited to signal-to-noise-plus-interference ratio (SINR) and reverse noise rise (RNR). SINR represents the value of a signal divided by the sum interference and background noise. RNR represents a metric of the uplink environment in cellular systems. It is defined as the noise rise due to out-of-cell emissions of adjacent cellular systems or uplink noise from the in-band operating devices. Typically in a high-RNR cellular system, the increase in the noise rise naturally translates to a decrease in the SINR. It also translates to an increase in the signal-to-noise ratio (SNR) required to maintain certain coverage contours or certain data rates.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as sensors that may be connected to a network as an IoT device.

Some network operators have proposed deployment of wireless devices capable of transmitting at a maximum allowable transmit power that is higher than a current maximum allowable transmit power of off-the-shelf wireless devices and/or other currently deployed wireless devices. Such devices may be categorized in terms of a power class, one example is set forth in Table 1 below.

|  | Power Class 1 | | Power Class 2 | | Power Class 3 | | Power Class 4 | |
| --- | --- | --- | --- | --- | --- | --- | --- | --- |
| Operating Band | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level (i.e., a transmission power capability) and tolerance (i.e., power error limits) with which wireless devices can transmit data on a given frequency band or sub-band (e.g., bands I-III) can be specified based on a predefined power class (e.g., power classes 1-4 shown in Table 1) of the wireless device rather than a physical maximum transmit capability of the wireless device. Off-the-shelf and/or other low-power wireless devices are defined in LTE as power class 3 and/or power class 4 wireless devices. Power class 3 and/or 4 low-power wireless devices can be configured with a maximum allowable transmit power level of +23 decibel-milliwatts (dBm) for frequency bands I-III with a nominal power tolerance of ±2 decibels (dB) (e.g., for Evolved Universal Mobile Telecommunications System Terrestrial Radio Access (E-UTRA) bands). High-power class wireless devices, which may also be referred to as high-power user equipment or HPUEs, are defined as power class 1 or power class 2 wireless devices. HPUEs can be configured with a maximum transmit power level of +26 dBm for frequency bands I-II and/or +31 dBm for frequency band I with a nominal power tolerance of ±2 dB (e.g., for E-UTRA bands), as illustrated in Table 1.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

Embodiments disclosed herein operate in a network supporting Cat-M1, which is supported by devices having a particular chipset. Cat-M1 supports lower data-rate applications and is appropriate for low-power sensing and monitoring devices such as health and fitness wearables, utility meters, and vending machines, tracking, and other applications. Cat-M1 offers a lower bandwidth than most cellular services, although higher than NB-IoT applications.

Figure 1:
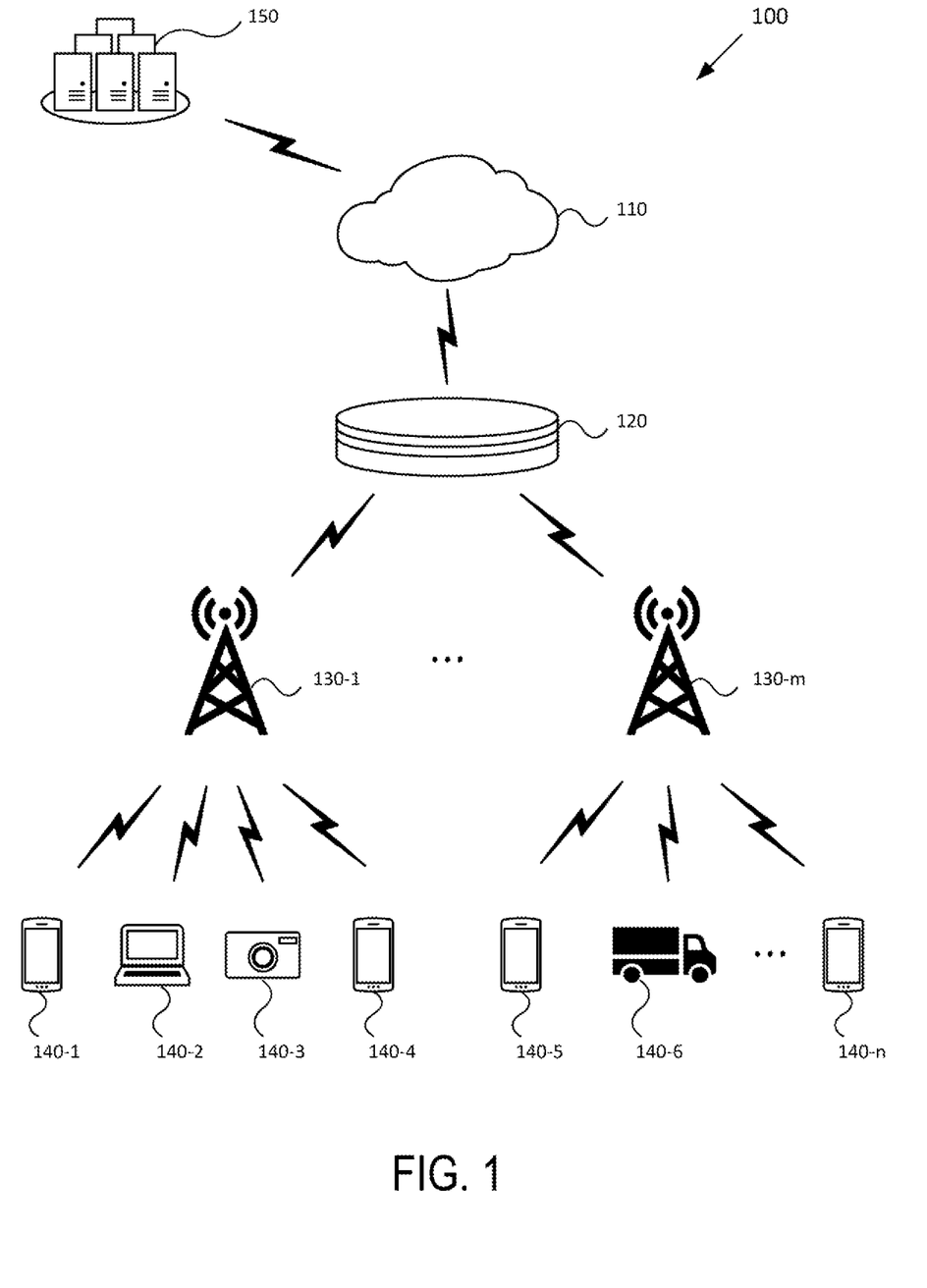
FIG. 1 illustrates an exemplary system for wireless communication in accordance with various aspects of the present disclosure.

FIG. 1 illustrates an exemplary system 100 for use with various aspects of the present disclosure. As illustrated, the system 100 includes a cloud platform 110, a core network 120, and a plurality of access nodes 130-1 to 130-m (collectively referred to as access nodes 130), and a plurality of wireless devices 140-1 to 140-n (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network via a wired connection.

The cloud platform 110, which may be an IoT cloud platform, may perform processing and forward results to the computing systems and devices 150 and/or the wireless devices 140. The core network 120, which may be an IoT core network, connects with the cloud platform 110 and the access nodes 130. Examples of the access nodes 130 will be described in more detail below with respect to FIGS. 2 and 3.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or low-complexity devices designed to communicate infrequently such as sensors, meters, wearables, trackers, and the like. The wireless devices 140 may be deployed in many environments, including remote and/or challenging radio environments such as the basement of a building or on a moving piece of machinery. In some implementations, the wireless devices 140 may send occasional signals for several years without a change or charge of battery. The core network 120 can collect and analyze data from sensors in the wireless devices 140 for real-time monitoring, GPS tracking, mobile route tracking, utility usage monitoring, and the like. Examples of the wireless devices 140 will be described in more detail below with respect to FIG. 2.

One or more of the access nodes 130 and one or more of the wireless devices 140 may be configured to operate using LTE and Cat-M1 RATs. Cat-M1 operates at 1.4 MHz bandwidth. Cat-M1 is a versatile low power wireless (IoT) RAT which supports high data rates (compared to, for example, NB-IoT), full mobility, and voice in typical coverage and which also supports deep coverage scenarios. Cat-M1 may operate using six physical resource blocks (PRBs) of the LTE carrier as will be described in more detail below with respect to FIG. 4.

Figure 2:
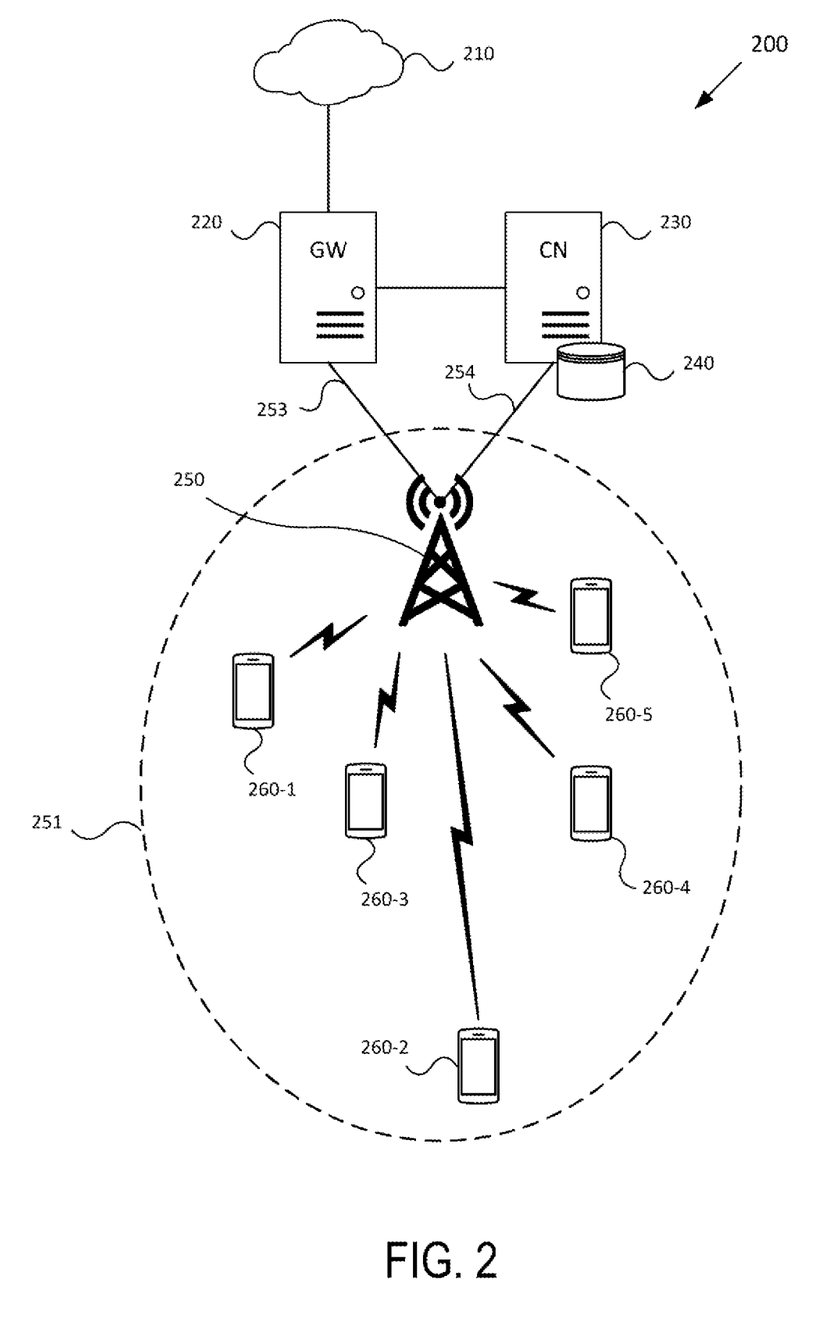
FIG. 2 illustrates an exemplary configuration of a system for wireless communication in accordance with various aspects of the present disclosure.

FIG. 2 illustrates a configuration for an exemplary system 200 in accordance with various aspects of the present disclosure. As illustrated, the system 200 comprises a communication network 210, a gateway node 220, a controller node 230 which includes a database 240, an access node 250, and a plurality of wireless devices 260-1 to 260-5 (collectively referred to as wireless devices 260). For purposes of illustration and ease of explanation, only one access node 250 is shown; however, as noted above with regard to FIG. 1, additional access nodes 250 may be present in the system 200. While five wireless devices 260 are shown for purposes of explanation, in practical implementations, any number of the wireless devices 260 (including zero or one) may be present at any given time.

The access node 250 is configured to provide communication in a first communication mode (e.g., LTE) and a second communication mode (e.g., Cat-M1) and is illustrated as having a coverage area 251. Each of the wireless devices 260 are present or may become present in the coverage area 251. The access node 250 may provide additional coverage areas corresponding to different RATs (such as 4G and/or 5G RATs), different frequency bands, and the like. In the illustration of FIG. 2, five wireless devices 260-1 to 260-5 are located within the coverage area 251, and are connected to and access network services from the access node 250. In accordance with various aspects of the present disclosure, the access node 250 may monitor noise characteristics of the network and dynamically allocate and/or restrict access of the wireless devices 260 to resources of the access node 250.

A scheduling entity may be located within the access node 250 and/or the controller node 230, and may be configured to allocate resources and RATs to improve overall network resource utilization and performance. This may be accomplished by, for example, assigning or allocating one or more of the wireless devices 260 to particular resource blocks. For example, if the noise in the system is greater than a predetermined threshold, the scheduling entity may determine that certain resource blocks should be allocated to communication in only one RAT and that wireless devices communicating in other RATs should be restricted from accessing the certain resource blocks.

The access node 250 can be any network node configured to provide communications between the wireless devices 260 and communication network 210, including standard access nodes and/or short range, lower power, small access nodes. As examples of a standard access node, the access node 250 may be a macrocell access node, a base transceiver station, a radio base station, a gNodeB in 5G networks, an eNodeB in 4G/LTE networks, or the like. In one particular example, the access node 250 may be a macrocell access node in which a range of the coverage area 251 is from approximately five to thirty-five kilometers (km) and in which the output power is in the tens of watts (W). As examples of a small access node, the access node 250 may be a microcell access node, a picocell access node, a femtocell access node, or the like, including a home gNodeB or a home eNodeB.

The access node 250 can comprise one or more processors and associated circuitry to execute or direct the execution of computer-readable instructions such as those described herein. In so doing, the access node 250 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 250 can receive instructions and other input at a user interface. The access node 250 communicates with the gateway node 220 and the controller node 230 via communication links 253 and 254, respectively. The access node 250 may also communicate with other access nodes using a direct link (e.g., an X2 link or the like).

Figure 3:
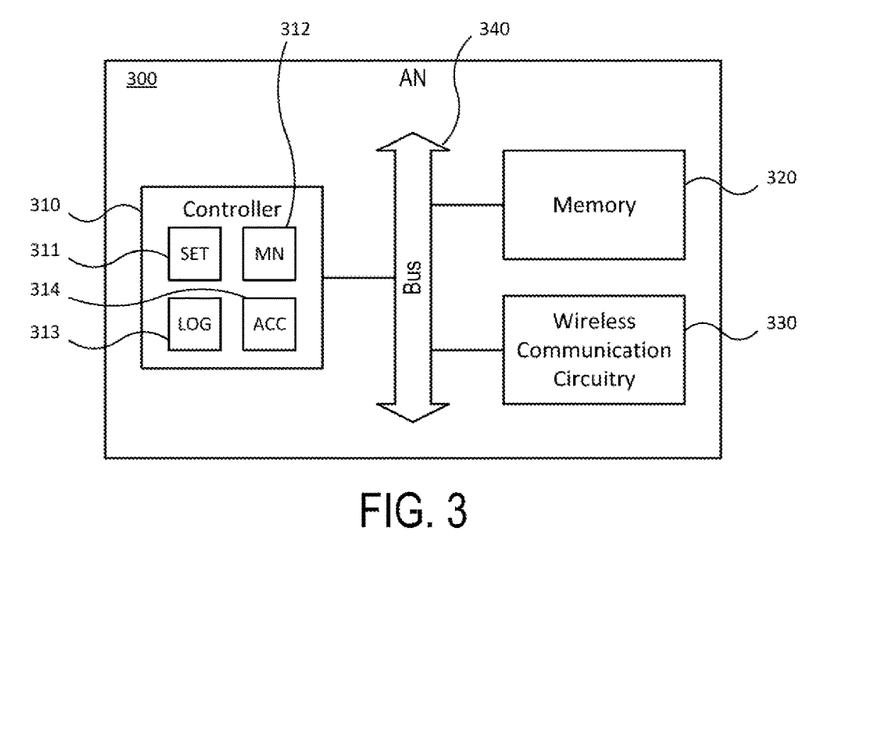
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 250 shown in FIG. 2. As illustrated the access node 300 includes a controller 310, a memory 320, wireless communication circuitry 330, and a bus 340 through which the various elements of the access node 300 communicate with one another. As illustrated, the controller 310 includes submodules or units, each of which may be implemented via dedicated hardware (e.g., circuitry), software modules which are loaded from the memory 320 and processed by the controller 310, firmware, and the like, or combinations thereof. The access node 300 may include a plurality of PRBs as illustrated in FIG. 4.

Figure 4:
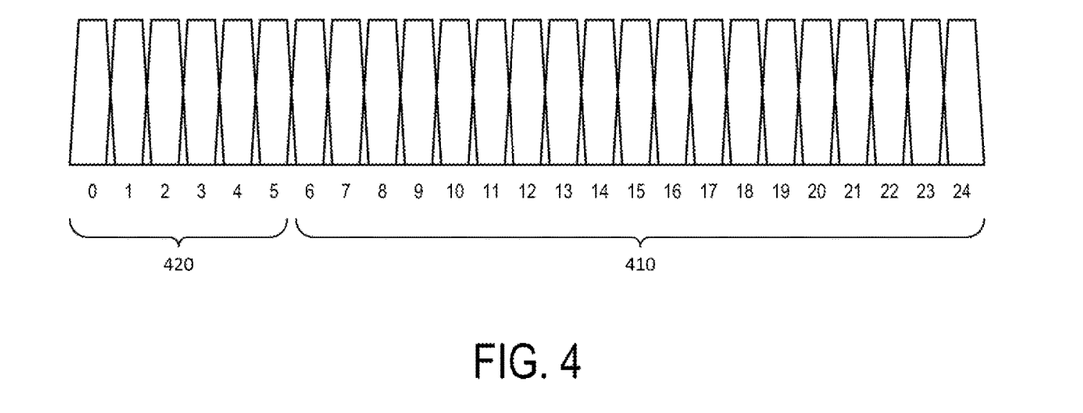
FIG. 4 illustrates an exemplary set of resources in accordance with various aspects of the present disclosure.

FIG. 4 illustrates 25 PRBs, which are identified by indices 0 to 24. Cat-M1 nodes utilize resources that may be shared with LTE in certain communication modes. For example, where the access node 300 is operating in a dynamic mode (e.g., a Quality of Service Class Identifier (QCI) mode), connected Cat-M1 UEs use shared resources. This may be contrasted with cases where the access node 300 is operating in a static mode, in which resources are specifically assigned to Cat-M1. An example of operation in the dynamic mode is illustrated in FIG. 4, which shows an implementation in which the resources include dedicated resource blocks 410 (i.e., a first plurality of resource blocks corresponding to PRBs which are used only for LTE) and common resource blocks 420 (i.e., a second plurality of resource blocks corresponding to PRBs which are shared between Cat-M1 and LTE). While FIG. 4 illustrates PRBs 0-5 as the common resource blocks 420 and PRBs 6-24 as the dedicated resource blocks 410, the present disclosure is not so limited. In practice, the common resource blocks 420 may comprise any subset of the total resources (for Cat-M1, totaling six consecutive PRBs).

When operating in the dynamic mode, a comparative access node which does not have a system, method, or other mechanism in place for blocking access to the common resources for LTE UEs may suffer from an overall reduction in performance of the Cat-M1 UEs as a result of the resource usage of the LTE UEs. In one particular example, the use of common resources by LTE UEs may cause the RNR to increase to undesirable levels on the common resources. In such a case, LTE HPUEs that are capable of transmitting at an average of 26 dBm may contribute to high reverse noise and thus impact the overall performance of the Cat-M1 UEs which may, for example, transit at only 23 dBm.

Thus, the access node 300 may implement a system and/or method to dynamically determine access to the common resource blocks 420. In one example as illustrated in FIG. 3, the controller 310 includes a setting unit 311, which may be configured to set a noise threshold for the access node 300; a monitoring unit 312, which may be configured to monitor a noise parameter and/or historical noise data (e.g., RNR) of the access node 300 corresponding to the common resource blocks 420; a logic unit 313, which may be configured to compare the noise parameter and/or historical noise data to the noise threshold; and a access control unit 314, which may be configured to restrict access to the common resource blocks 420 for communication in a first communication mode (e.g., LTE) in response to a determination that the noise parameter and/or historical noise data exceeds the noise threshold. and/or permit access to the common resource blocks 420 for communication in both the first communication mode and a second communication mode (e.g., Cat-M1) in response to a determination that the noise parameter and/or historical noise data does not exceed the noise threshold. The setting unit 311, the monitoring unit 312, the logic unit 313, and the access control unit 314 are illustrated as residing within the controller 310 for ease of explanation; however, one or more of the units may instead reside within the memory 320 and/or may be provided as separate units within the access node 300. Moreover, while the setting unit 311, the monitoring unit 312, the logic unit 313, and the access control unit 314 are illustrated as separate units, in practical implementations some or all of the units may be combined and/or share components.

The wireless communication circuitry 330 may respectively include circuit elements configured to generate wireless signals (e.g., one or more antennas) as well as interface elements configured, for example, to translate control signals from the controller 310 into data signals for wireless output. The access node 300 may include additional wireless communication circuitry elements, for example to communicate using RATs other than the first communication mode and the second communication mode. The access node 300 may be configured to transmit commands via the wireless communication circuitry 330. For example, the access node 300 may be configured to transmit a network command to a wireless device (e.g., to the wireless devices 140 or 260), thereby causing the wireless device to utilize particular resources.

Returning to FIG. 2, the wireless devices 260 may respectively be any device, system, combination of devices, or other such communication platform capable of communicating wirelessly with access node 250 using one or more frequency bands deployed therefrom; for example, a Cat-M1 band. The wireless devices 260 may respectively be, for example and without limitation, a mobile phone, a wireless phone, a wireless modem, a personal digital assistant (PDA), a voice over internet protocol (VoIP) phone, a voice over packet (VoP) phone, a voice over new radio (VoNR) device, a soft phone, a sensor, a meter, a tracking device, or other types of devices or systems which can exchange audio or data via the access node 250, including IoT devices.

The communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless devices 260. Wireless network protocols can comprise Multimedia Broadcast Multicast Services (MBMS), CDMA, 1xRTT, GSM, UMTS, High Speed Packet Access (HSPA), Evolution-Data Optimized (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links 253 and 254 may respectively use various communication media, such as air, space, metal, optical fiber, other signal propagation paths, and combinations thereof. The communication links 253 and 254 may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1xRTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links 253 and 254 may respectively be a direct link or might include various equipment, intermediate components, systems, and networks. The communication links 253 and 254 may comprise many different signals sharing the same link.

The gateway node 220 may be any network node configured to interface with other network nodes using various protocols. The gateway node 220 can communicate user data over the system 200. The gateway node 220 may be a standalone computing device, computing system, or network component, and can be accessible by, for example, a wired or wireless connection, or through an indirect connection such as via a computer network or communication network. The gateway node 220 may include but is not limited to a serving gateway (SGW) and/or a public data network gateway (PGW). Additionally or alternatively, the gateway node 220 may include user plane network functions (NFs), such as a User Plane Function (UPF). The gateway node 220 is not limited to any specific technology architecture, such as LTE or 5G NR, but may be used with any network architecture and/or protocol.

The gateway node 220 can comprise a processor and associated circuitry to execute or direct the execution of computer-readable instructions to obtain information. In so doing, the gateway node 220 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node 220 can receive instructions and other input at a user interface.

The controller node 230 may be any network node configured to communicate and/or control information over the system 200. The controller node 230 may be configured to transmit control information associated with resource usage thresholds and/or usage parameters. The controller node 230 may be a standalone computing device, computing system, or network component, and can be accessible by, for example, a wired or wireless connection, or through an indirect connection such as via a computer network or communication network. The controller node 230 may include but is not limited to a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, and the like. Additionally or alternatively, the controller node 230 may comprise user plane NFs and/or control plane NFs, including but not limited to a Core Access and Mobility Management Function (AMF), an Authentication Server Function (AUSF), a Unified Data Management (UDM), a Session Management Function (SMF), a Policy Control Function (PCF), an Application Function (AF), a Network Exposure Function (NEF), a NF Repository Function (NRF), a Network Slice Selection Function (NSSF), a Short Message Service Function (SMSF), and the like. The controller node 230 is not limited to any specific technology architecture, such as LTE or 5G NR, but may be used with any network architecture and/or protocol.

The controller node 230 can comprise a processor and associated circuitry to execute or direct the execution of computer-readable instructions to obtain information. In so doing, the controller node 230 can retrieve and execute software from storage, which can include a disk drive, a flash drive, memory circuitry, or some other memory device, and which may be local or remotely accessible. As illustrated in FIG. 2, the controller node 230 includes the database 240 for storing information, such as predetermined resource usage thresholds utilized for dynamically managing RATs of the wireless devices 260, as well as positions and/or characteristics of the wireless devices 260. The database 240 may further store handover thresholds, scheduling schemes, and resource allocations for the access node 250, the wireless devices 260, and so on. This information may be requested or shared with the access node 250 via the communication link 254, X2 connections, and the like. The software may comprise computer programs, firmware, or some other form of machine-readable instructions, and may include an operating system, utilities, drivers, network interfaces, applications, or some other type of software, including combinations thereof. Moreover, the controller node 230 can receive instructions and other input at a user interface.

Other network elements may be present in system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access nodes 250 and communication network 210.

Devices or systems in accordance with various aspects of the present disclosure may perform various operations to dynamically determine access to or allocation of common resource blocks. Exemplary methods including these operations are illustrated in FIGS. 5-8. The methods of FIGS. 5-8 may be triggered by various events, and in some examples may be performed continually at predetermined intervals and/or in response to network noise characteristics. The methods of FIGS. 5-8 may be performed by, for example, the scheduling entity described above. For purposes of explanation, the methods of FIGS. 5-8 will be described as being performed in the access node 300 and as corresponding to the dedicated resource blocks 410 and the common resource blocks 420; however, this is merely exemplary and not limiting.

Figure 5:
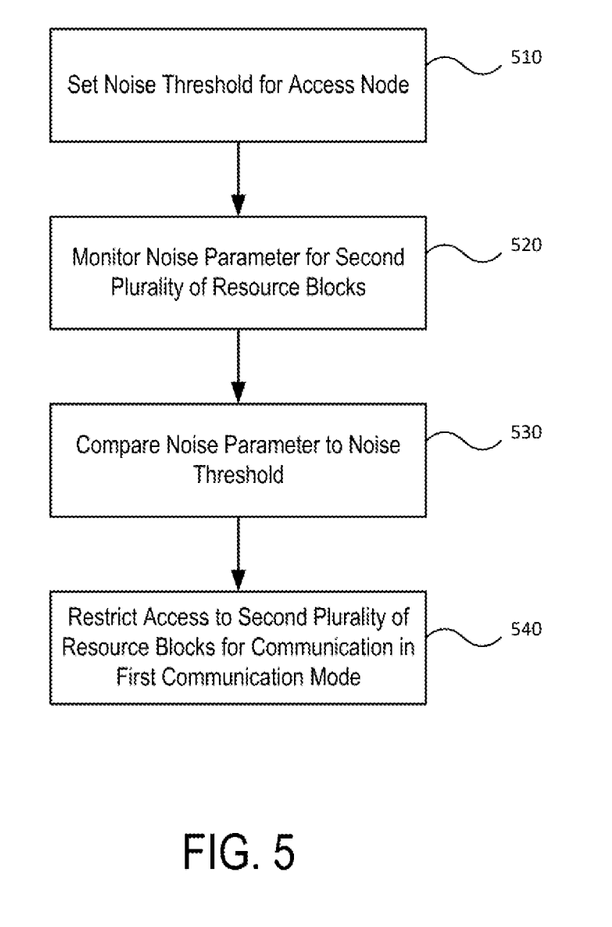
FIG. 5 illustrates an exemplary process flow for managing network resources in accordance with various aspects of the present disclosure.

FIG. 5 illustrates an exemplary method which may be performed in the event of an increase in noise. At operation 510, the access node 300 sets a noise threshold (e.g., an RNR threshold). The noise threshold may refer to a noise value above which the network is deemed to be exhibiting poor performance. The noise threshold may be predetermined by a network operator, or may be determined in response to a network status. The noise threshold may be specific to a particular PRB or group of PRBs (e.g., all common resources), or may be a general value used for all PRBs.

At operation 520, the access node 300 monitors a noise parameter corresponding to one or more of the common resource blocks 420. The noise parameter may correspond to an instantaneous measurement of noise or may correspond to an average of the instantaneous noise over a period of time. The period of time may have a duration predetermined by the network operator. In some implementations, the noise measurement is an RNR. At operation 530, the access node 300 compares the monitored noise parameter to the noise threshold. If the comparison results in a determination that the noise parameter exceeds the noise threshold, at operation 540 the access node 300 may restrict access to the one or more of the common resource blocks 420 for communication in a first communication mode (e.g., LTE). This restriction may have the effect of causing the one or more of the common resource blocks 420 to be available for communication in only a second communication mode (e.g., Cat-M1) and not the first communication mode, or may have the effect of causing the one or more of the common resource blocks 420 to be accessed differently (e.g., with a different transmit power).

Figure 6:
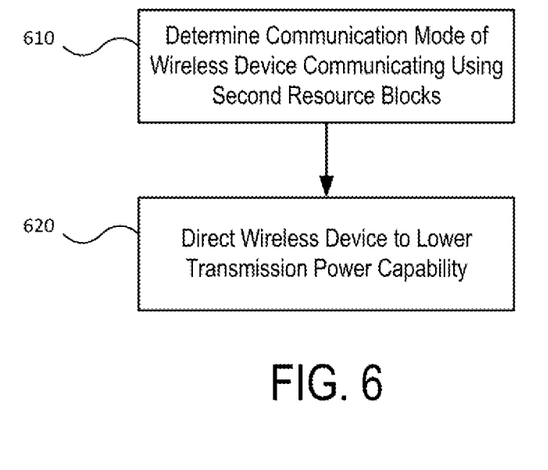
FIG. 6 illustrates another exemplary process flow for managing network resources in accordance with various aspects of the present disclosure.

In one example, operation 540 includes designating the one or more common resource blocks 420 for communication in only the second communication mode. Another example of operation 540 is illustrated in FIG. 6. In the example of FIG. 6, operation 540 includes an operation 610 of determining a communication mode of a wireless device or devices communicating using the one or more common resource blocks 420. For example, the access node 300 may determine whether any of the wireless devices accessing the one or more common resource blocks 420 are of a type corresponding to the first communication mode (e.g., HPUEs). If a particular wireless device corresponds to the first communication mode, at operation 620 the access node 300 may limit the transmit power capability of the wireless device. In one particular example, the access node 300 may limit the transmit power capability of the HPUEs from an average power value of 26 dBm to 23 dBm or lower. The determination of the type of any particular wireless device may be based on the UE capability report of that wireless device.

Figure 7:
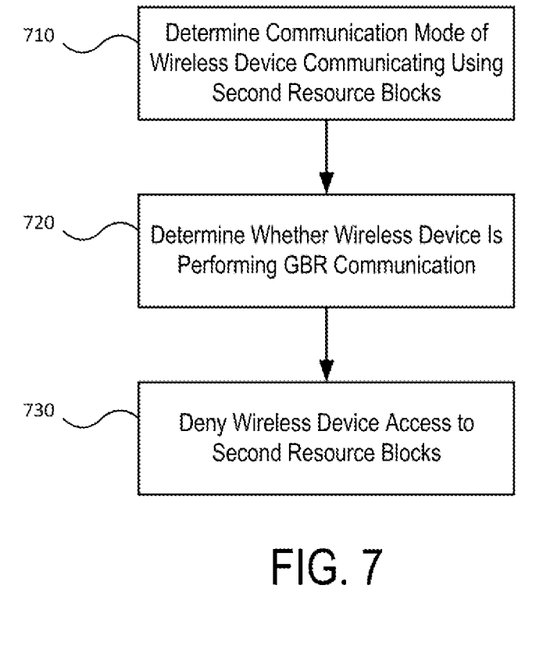
FIG. 7 illustrates another exemplary process flow for managing network resources in accordance with various aspects of the present disclosure.

Yet another example of operation 540 is illustrated in FIG. 7. In the example of FIG. 7, operation 540 includes an operation 710 of determining a communication mode of a wireless device or devices communicating using the one or more common resource blocks 420. For example, the access node 300 may determine whether any of the wireless devices accessing the one or more common resource blocks 420 are of a type corresponding to the first communication mode (e.g., HPUEs). If a particular wireless device corresponds to the first communication mode, at operation 720 the access node 300 may determine a communication type of the wireless device; for example, whether the wireless device is performing a guaranteed bitrate (GBR) communication or a non-GBR communication. If the wireless device is performing a non-GBR communication, at operation 730 the access node 300 may deny the wireless device access to the one or more common resource blocks 420. In this manner, the access node 300 may permit only GBR traffic via the common resource blocks 420.

The operations of FIGS. 6 and 7 may be usable together; for example, depending on the severity of the noise. In one example, the operations of FIG. 6 may be performed when the noise parameter exceeds a first threshold but the operations of FIG. 7 may be performed when the noise parameter exceeds a second, higher threshold. Moreover, the operations of FIGS. 6 and 7 are not limited to situations where HPUEs are present on the network. In some examples, the operations of FIGS. 6 and/or 7 may be performed where there are LTE UEs (other than HPUEs) which are transmitting at a higher transmit power on average compared to the Cat-M1 UEs.

The operations of FIG. 5 (including, where applicable, the operations of FIGS. 6 and/or 7) are not necessarily performed in a strict series from operation 510 to operation 540. In some implementations, the access node 300 may perform operation 510 once for a given period of time, perform operations 520 and 530 repeatedly or continuously until the noise parameter exceeds the noise threshold, and then perform operation 540. After the resources have been appropriately restricted or assigned, the access node 300 may return to operation 520 without resetting the noise threshold.

Figure 8:
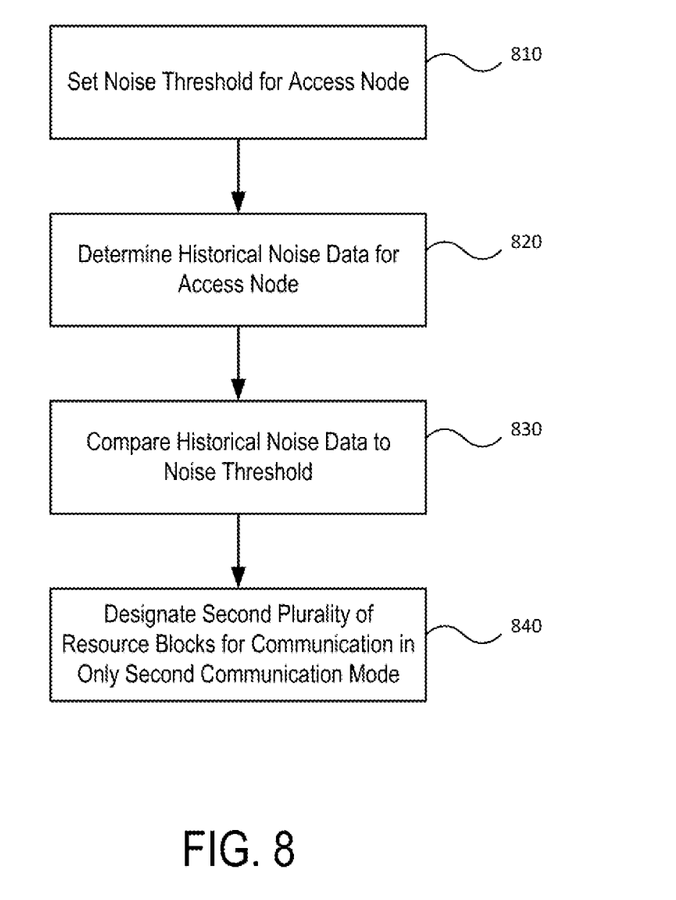
FIG. 8 illustrates another exemplary process flow for managing network resources in accordance with various aspects of the present disclosure.

The present disclosure may also be implemented based on historical noise data in addition to or as an alternative to instantaneous or averaged instantaneous noise data. FIG. 8 illustrates an exemplary method which may be performed in the event of high historical noise. At operation 810, the access node 300 sets a noise threshold (e.g., an RNR threshold). The noise threshold may refer to a noise value above which the network is deemed to be exhibiting poor performance. The noise threshold may be predetermined by a network operator, or may be determined in response to a network status. The noise threshold may be specific to a particular PRB or group of PRBs (e.g., all common resources), or may be a general value used for all PRB s.

At operation 820, the access node 300 determines a historical noise data corresponding to one or more of the common resource blocks 420. The historical noise data may be, for example, retrieved from the memory 320 or from a storage location external to the access node 300. In some implementations, the historical noise data may be a historical RNR. At operation 830, the access node 300 compares the monitored noise parameter to the noise threshold. If the comparison results in a determination that the noise parameter exceeds the noise threshold, at operation 840 the access node 300 may designate the one or more of the common resource blocks 420 (e.g., only those blocks which exhibit high historical noise) for communication only in a second communication mode (e.g., Cat-M1) and not a first communication mode (e.g., LTE). Thereby, the access node 300 may allow only Cat-M1 UEs to access common resource blocks 420 corresponding to historically noisy sectors.

The operations of FIG. 8 are not necessarily performed in a strict series from operation 810 to operation 840. In some implementations, the access node 300 may perform operation 810 once for a given period of time and then perform operations 820 to 840. After a predetermined period of time designated by a network operator (which may be equal to or shorter than the given period of time in which operation 810 is performed once) or in response to a network command, the access node 300 may perform operations 820 to 840 based on updated historical noise data.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network resources, comprising:
setting a noise threshold for an access node, wherein the access node includes a first plurality of resource blocks corresponding to communication in a first communication mode and a second plurality of resource blocks corresponding to communication in either of the first communication mode or a second communication mode;
monitoring a noise parameter for the second plurality of resource blocks, including:
monitoring an instantaneous noise over a period of time having a duration predetermined by a network operator, and
setting an average of the instantaneous noise over the period of time as the noise parameter;
comparing the noise parameter to the noise threshold; and
in response to a determination that the noise parameter exceeds the noise threshold, restricting access to the second plurality of resource blocks for communication in the first communication mode.

2. The method according to claim 1, wherein restricting access includes designating the second plurality of resource blocks for communication in only the second communication mode.

3. The method according to claim 1, wherein restricting access includes:
determining whether a wireless device communicating with the access node using one of the second plurality of resource blocks is operating in the first communication mode or the second communication mode; and in response to a determination that the wireless device is using the first communication mode, directing the wireless device communicating to lower a transmission power capability from a first average power value to a second average power value.

4. The method according to claim 3, wherein the second average power value is 23 decibel-milliwatts (dBm) or lower.

5. The method according to claim 1, wherein restricting access includes:
determining whether a wireless device communicating with the access node using one of the second plurality of resource blocks is operating in the first communication mode or the second communication mode;
in response to a determination that the wireless device is using the first communication mode, determining whether the wireless device is performing a guaranteed bitrate (GBR) communication;
in response to a determination the wireless device is performing the GBR communication, permitting the wireless device access to the second plurality of resource blocks; and
in response to a determination that the wireless device is not performing the GBR communication, denying the wireless device access to the second plurality of resource blocks.

6. The method according to claim 1, wherein the noise parameter is a reverse noise rise.

7. The method according to claim 1, wherein the first communication mode is a Long Term Evolution (LTE) mode, and the second communication mode is a Category M1 (Cat-M1) communication mode.

8. The method according to claim 1, wherein the second plurality of resource blocks is six physical resource blocks (PRBs).

9. A system for managing network resources, comprising:
an access node including a first plurality of resource blocks corresponding to communication in a first communication mode and a second plurality of resource blocks corresponding to communication in either of the first communication mode or a second communication mode, and at least one electronic processor configured to perform operations including:
setting a noise threshold for the access node,
monitoring a noise parameter for the second plurality of resource blocks, including:
monitoring an instantaneous noise over a period of time having a duration predetermined by a network operator, and
setting an average of the instantaneous noise over the period of time as the noise parameter,
comparing the noise parameter to the noise threshold, and
in response to a determination that the noise parameter exceeds the noise threshold, restricting access to the second plurality of resource blocks for communication in the first communication mode.

10. The system according to claim 9, wherein the second plurality of resource blocks is six physical resource blocks (PRBs).

11. The system according to claim 9, wherein restricting access includes designating the second plurality of resource blocks for communication in only the second communication mode.

12. The system according to claim 9, wherein restricting access includes:
determining whether a wireless device communicating with the access node using one of the second plurality of resource blocks is operating in the first communication mode or the second communication mode; and
in response to a determination that the wireless device is using the first communication mode, directing the wireless device communicating to lower a transmission power capability from a first average power value to a second average power value.

13. The system according to claim 12, wherein the second average power value is 23 decibel-milliwatts (dBm) or lower.

14. The system according to claim 9, wherein restricting access includes:
determining whether a wireless device communicating with the access node using one of the second plurality of resource blocks is operating in the first communication mode or the second communication mode;
in response to a determination that the wireless device is using the first communication mode, determining whether the wireless device is performing a guaranteed bitrate (GBR) communication;
in response to a determination the wireless device is performing the GBR communication, permitting the wireless device access to the second plurality of resource blocks; and
in response to a determination that the wireless device is not performing the GBR communication, denying the wireless device access to the second plurality of resource blocks.

15. The system according to claim 9, wherein the noise parameter is a reverse noise rise.

16. The system according to claim 9, wherein the first communication mode is a Long Term Evolution (LTE) mode, and the second communication mode is a Category M1 (Cat-M1) communication mode.

17. A method of managing network resources, comprising:
setting a noise threshold for an access node, wherein the access node includes a first plurality of resource blocks corresponding to communication in a first communication mode and a second plurality of resource blocks corresponding to communication in either of the first communication mode or a second communication mode;
determining a historical noise data for the access node;
comparing the historical noise data to the noise threshold;
in response to a determination that the historical noise data exceeds the noise threshold, designating the second plurality of resource blocks for communication in only the second communication mode; and
in response to a determination that the historical noise data does not exceed the noise threshold, designating the second plurality of resource blocks for communication in both of the first communication mode and the second communication mode.

18. The method according to claim 17, wherein the first communication mode is a Long Term Evolution (LTE) mode, and the second communication mode is a Category M1 (Cat-M1) communication mode.

19. The method according to claim 17, wherein the historical noise data corresponds to a measure of a reverse noise rise.

* * * * *